United States Patent Office 3,116,107
Patented Dec. 31, 1963

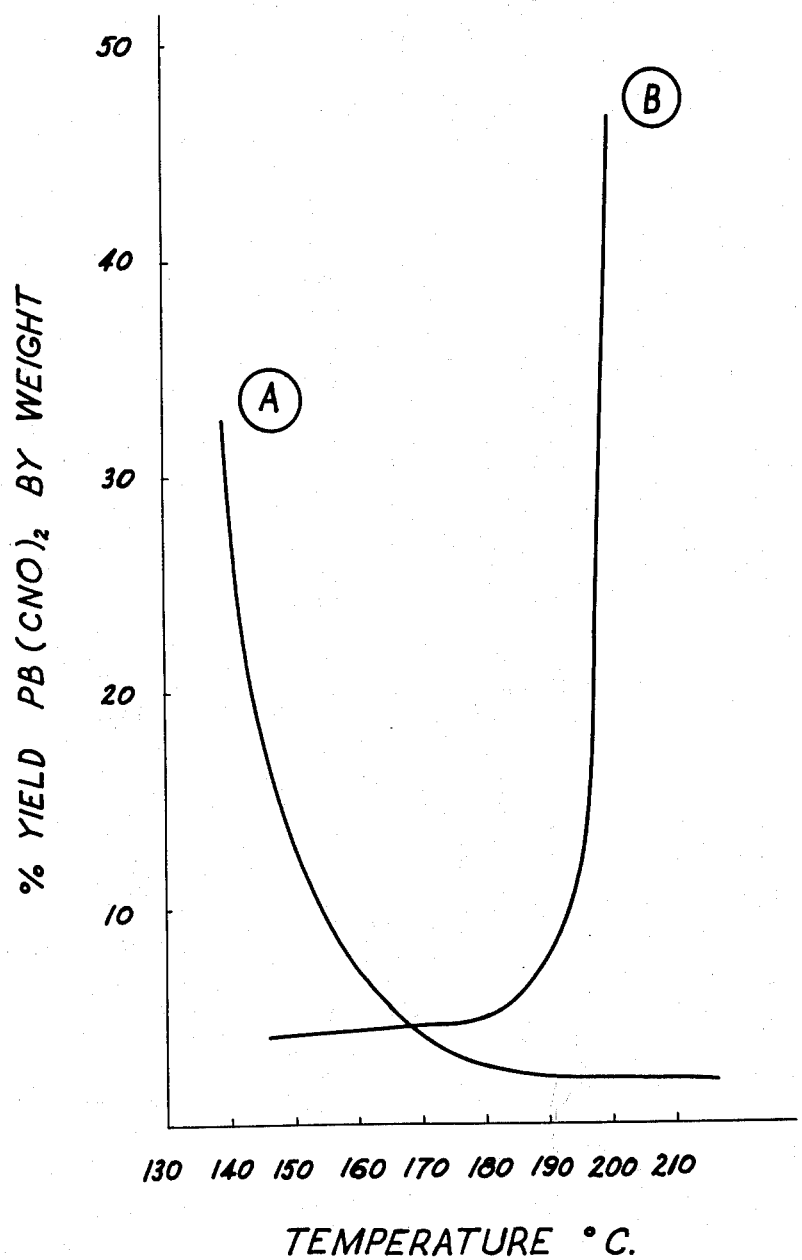

3,116,107
PREPARATION OF LEAD CYANATE
Gunner E. Nelson, Baton Rouge, La., assignor to Ethyl Corporation, New York, N.Y., a corporation of Virginia
Filed Dec. 27, 1961, Ser. No. 162,429
8 Claims. (Cl. 23—75)

The present invention relates to a process for the preparation of lead cyanate by the reaction of lead compounds with urea.

The preparation of metal cyanates in general by the reaction of metallic oxides or carbonates with urea is well known in the art. However, these processes have been perfected with an emphasis on the production of alkali and alkaline earth metal cyanates. These processes lend themselves to the production of the latter cyanates mainly in the light of their ease of preparation which may be attributed to the high chemical reactivity of the alkali and alkaline earth metals. In addition, such processes have also been extended to the production of metal cyanates of other less reactive metals, particularly those of groups I-B, II-B, III-A, and IV-A of the periodic chart of the elements, Fisher Scientific Company (1955). Unfortunately, these prior art processes suffer inherent limitations when applied to the preparation of cyanates of less reactive metals, such as lead cyanate. Apparently these limitations in the art have been tolerated heretofore because of the lack of commercial interest in such cyanates as lead cyanate. However, lead cyanate has recently demonstrated many unique advantages when employed in the preparation of coatings for metals and as intermediates for the production of monomers in the plastic field. Consequently a need exists in the art for improved processes for the preparation of lead cyanate.

Processes heretofore employed for the preparation of lead cyanate are characterized by their use of high temperatures and pressurized atmospheres. It is apparent that such operating conditions are disadvantageous from a commercial viewpoint in that expensive process equipment is necessary. Another serious and costly limitation of these prior art processes is the practice of producing lead cyanate by reactions employing a large excess of urea. Besides increasing the cost of the final product, a large excess of urea also requires extensive equipment necessary for the removal of its by-products produced upon decomposition of the urea. Additionally, these by-products also affect the yield and purity of the final product, particularly in a pressure process, in that they combine with and contaminate the end product. Therefore a process overcoming the disadvantage noted above while simultaneously contributing to the art a method exemplified by ease and simplicity of operation would be of immeasurable value.

It is an object of the present invention to provide a new and novel process for the production of lead cyanate. Another object is to provide a process for the production of lead cyanate in good yields and very high purity characterized by simplicity and ease of operation. A more specific object is to prepare lead cyanate by an attractive process involving use of a minimum excess of urea. A still further object of this invention is to provide a process for the manufacture of lead cyanate, the process being characterized by adaptation to practice on a batch or continuous basis and being distinguished by its production of this product at atmospheric pressure and lower temperatures than heretofore employed in the art for its preparation. These and other objects will become apparent from the discussion hereinafter.

The above and other objects of this invention are accomplished by reacting a lead salt—preferably lead oxide—with urea. The reactants are prepared by physically reducing them to a pulverulent state either before or after mixing them in the desired proportions. The mixed reactants are heated within a temperature range of from about 130 to 150° C. at essentially atmospheric pressure. Ammonia is given off as a by-product and thus serves as a convenient index of reaction. A preferred embodiment of this invention comprises conducting the reaction within the range of about 135 to 145° C. A more specific preferred embodiment of this invention comprises reacting a mole ratio of urea to lead oxide within the range of from about 2.5:1 to about 2:1. A still more specific embodiment of this invention comprises preparing the reactants by physically reducing them to an average particle size of less than about 2 mm. and then forming a layer of the reactants on an inert surface so as not to exceed about 2 inches in thickness. It is to be noted, however, that the reactants may be in motion in the course of the reaction, such as in a fluidized system, just as long as the reactants are not packed to such an extent so as to suppress the reaction. The maximum thickness of the reactant bed mentioned supra insures the easy and ready removal of gaseous by-products produced in the course of the reaction. In all of the embodiments of this invention its end product is characterized by high purity thus avoiding the necessity of extensive treatment or purification. The latter feature is especially attractive when employing lead cyanate produced by the process of this invention in a coating system. In such an instance it is mandatory to utilize a pure white lead cyanate free from any coloration which may exist by virtue of unreacted urea or other undesirable side products. This process while overcoming the contamination limitations existing in the prior art combines the economy and efficiency that is demanded for commercial feasibility and operation.

To illustrate the unique commercial advantages of the process of this invention attention is directed to the drawing wherein curve B represents a typical prior art process and curve A represents the distinctive merit of this invention. In the drawing, the abscissa represents the temperature of the process and the ordinate represents the percent of yield of lead cyanate by weight. To obtain the data plotted as curve B a number of runs were made using a closed system under elevated, autogenous pressure in which urea and lead oxide were copresent in a mole ratio of 3:1 respectively. The reaction time in each instance was 30 minutes. The only condition that was varied in these runs was the temperature as shown by the abscissa. As depicted by curve B the prior art is restricted to the use of temperatures exceeding 190° C. for the attainment of good yields of lead cyanate. On the other hand curve A represents the results of runs using atmospheric pressure and mole ratios of urea to lead oxide of only 2.33:1. In this instance the individual reaction time average only 15 minutes. It is seen that pursuant to this invention, low temperatures give very good yields of lead cyanate.

To further demonstrate the process of this invention, the following examples are presented wherein all parts and percentages are by weight.

*Example I*

About 1 mole of lead oxide was ground in a hammer mill to an average particle size below about 4 mm. About 2.33 moles of urea was ground in a hammer mill to an average particle size below about 4 mm. The lead oxide and the urea was then blended and reground in a hammer mill to result in a mixture of lead oxide and urea in which the average particle sizes were less than about 2 mm. This mixture was then placed on an inert surface which had been preheated to about approximately 140°

C. Care was taken to spread the mixture evenly over the surface of the inert surface so as to achieve a layer approximately ¼" thick. The reactants were heated at the temperature noted above for about 30 minutes at atmospheric pressure. The volatilizable materials produced as a by-product of the reaction were permitted to escape to the atmosphere. At the completion of the reaction period mentioned above, the solid product remaining on the inert surface was analyzed and found to consist of greater than 22 percent lead cyanate of a high purity.

*Example II*

About 1 mole of lead oxide was passed through a hammer mill so as to reduce it to an average particle size of less than 2 mm. About 2.33 moles of urea was passed through a hammer mill so as to reduce it to an average particle size of about 2 mm. These materials were then premixed and placed on an inert surface which had been preheated to about 140° C. and distributed thereover to a thickness of about ⅛". The reaction mixture was maintained at the 140° C. temperature for approximately 5 minutes at atmospheric pressure. The volatilizable materials, namely water and ammonia were permitted to escape to the atmosphere. At the end of the 5 minute time period, a solid product of high purity remained which was analyzed without further treatment and found to be lead cyanate. A yield greater than 29 percent was realized.

*Example III*

One mole of lead oxide was ground in a hammer mill to an average particle size below about 3 mm. About 2.33 moles of urea was ground in a hammer mill to an average particle size below about 2 mm. These materials were then blended and placed on an inert surface preheated to about 140° C. and distributed over the inert surface to a thickness of about ½". The blended reactants were then heated at the 140° C. temperature for a period of time not exceeding 15 minutes at atmospheric pressure. The volatilizable materials which were water and ammonia were permitted to escape to the atmosphere. At the end of the time period noted above, a yield of lead cyanate greater than 31 percent was realized.

*Example IV*

One mole of lead oxide is premixed with 2.33 moles of urea. These reactants are then passed through a hammer mill so as to reduce them to an average particle size of less than about 2 mm. The reactants are then continuously introduced into a rotating cylindrical member having an inert inner surface on which the reaction is to take place. The rotating cylindrical member is exposed exteriorly to a source of heat maintained at 140° C. based upon the temperature of exit gases produced as a by-product of the subject reaction. The rate of feeding the reactants and the rate of rotation of the cylindrical member is governed so as to realize a residence time of the reactants in the member of approximately 10 minutes. A slight vacuum is induced on the inlet end of the rotating member so as to purge the by-products ammonia and water from within the member. These gases are withdrawn from the inlet end of the cylindrical member so as to preheat the incoming reactants after which these gases are then condensed for utilization in the preparation of other valuable compounds. A sample of the end product received at the discharge end of the cylindrical member is analyzed and found to consist of greater than 29 percent lead cyanate of high purity.

The reactants may be prepared by either of two procedures. They may be first individually ground in a hammer mill or similar mixing device so as to achieve the desired particle size and then mixed preparatory to their reaction. Conversely, the reactants may be first premixed and then passed through a hammer mill or similar device to achieve the desired average particle size. The average particle size of the reactants should preferably be less than about 4 mm. The use of particle sizes of approximately 4 mm. and the blending of the reactants essentially avoids or prevents competing side reactions which result in products of lesser purity and reduced yields. The method of reducing the reactants to the desired particle size may be by grinding, ballmilling, spray drying, controlled precipitation or the like.

It is very desirable to conduct this process in the presence of an inert medium so as to avoid the possibility of contamination and the promotion of undesirable side reactions. A unique feature of this novel process is that it may be conducted upon a glass surface open to the atmosphere. However, other well known inert materials may be employed in conjunction with common material handling equipment, for example, a rotary drum, a link belt surface, multiple pan conveyor. If it is desired to practice the process in a continuous system, for example, the individual reactants can be ground separately, conveyed to a blender or mixer, conveyed to a heated rotary drum or a similar surface to carry out the reaction, and then the solid product is withdrawn from this surface continuously. This process may also be practiced by means comprising a fluidized system wherein an inert gas, such as essentially anhydrous nitrogen or air, would serve both as a carrier gas and as an inert medium. As an ancillary feature, if desired, the by-product ammonia may be recovered or converted into valuable by-products, such as ammonium sulfate or ammonium phosphate. Other modifications of this process and its applicability to a continuous operation will be apparent to those skilled in the art.

A distinguishing feature of the process of this invention is that it is conducted at low temperatures. Generally speaking, temperatures less than about 150° C. are employed. In a preferred embodiment the temperature of the reaction is maintained between about 130 and 150° C. However, best results are realized when the temperature is maintained at about 135 to 145° C. While the use of temperatures in excess of 190° C. have been commonly employed in the prior art for the preparation of lead cyanates by methods generally utilized in the preparation of cyanates of more reactive metals, such temperatures are not desirable for the preparation of lead cyanate inasmuch as deleterious side effects result which are reflected not only in low yields of lead cyanate, but in products of low purity. When utilizing lead cyanate in a coating system it is essential that it be of high purity so as to achieve maximum corrosion protection and especially to realize a coating of the desired color which must be consistent and predictable from batch to batch. Prior art processes for the production of lead cyanate are characterized by their failure to achieve an end product of high purity whereby an extensive purification step is required. It is apparent that the further processing of such materials is extremely costly, therefore rendering the heretofore use of lead cyanate economically unfeasible.

The reaction period to be employed in the process of this invention is not critical. Reaction times may vary from a matter of minutes to that of several hours. However, this process offers as a distinguishing feature the utilization of relatively short reaction times. Desirable reaction times for this process usually range between 3 to 50 minutes. However, a preferred embodiment utilizes reaction times ranging between 5 to 20 minutes. The benefit of utilizing such short reaction times makes this process commercially attractive. Intimately related to the reaction times is the desirability of conducting this reaction where the thickness of the reaction bed is preferably maintained below about 2", irrespective of the reactant proportions. Best results are achieved, however, when the reactants are spread to a thickness of less than about ½". The desirable feature of maintaining the reaction bed within the stipulated thicknesses is to permit the easy removal of the volatile constituents. In a fluidized system, it would be desirable to maintain the density of the reactants in the reaction zone such that this same effect may be realized. To aid or reduce the reaction time, if desired, the reaction may be conducted in an enclosed medium wherein a slight vacuum is maintained so as to assist in the removal of these volatile constituents. A suitable range of pressures that may be employed is between 15″ Hg vacuum and up to atmospheric pressure. Removal of the volatile constituents can be important in certain instances, particularly since any by-product water, if allowed to remain with the lead cyanate will hydrolyze it and thereby reduce yield and purity.

A most significant and distinguishing feature of this novel process is its conductance at or under atmospheric pressure. The prior practice of preparing lead cyanate by reactions involving pressures greater than atmospheric invariably increases the cost of producing lead cyanate for a number of reasons. For one, a pressure process generally requires a greater excess of urea due to the promotion of deleterious side reactions wherein urea is expended and hence lost. Additionally, a pressure process prevents the ready removal of volatilizable constituents which unfortunately condense and contaminate the reactants because, for example, as in the case of water which will hydrolyze the product. On the other hand, it is apparent that the present atmospheric pressure process besides avoiding the above disadvantages invariably lends itself to economical and efficient commercial application since such a process minimizes expenditure for process equipment and its operation.

As mentioned above, a preferred embodiment of this invention utilizes a lead oxide as the subject lead compound of the process of this invention. Such lead oxide may be $PbO$, $Pb_3O_4$ or $PbO_2$. Of these $PbO$ is the most preferred. Other lead compounds which may be employed in the process of this invention while still achieving lead cyanate of high yield and purity are lead carbonate and lead amide. Further thiourea can be substituted for urea in the foregoing and other examples to produce the corresponding thiocyanates.

As to the proportion of the reactants, they may be varied from stoichiometric quantities to about 3 moles of urea to 1 mole of lead oxide. It is to be noted that the prior art processes heretofore utilized for the preparation of lead cyanate generally employ a proportion of 3:1 and greater while only achieving an end product of moderate purity. In regards to the present process best results are achieved when employing from 2.0 to 2.5 moles of urea per mole of lead oxide. A product of high purity and good yield is still obtained however, when this molar proportion is reduced so as to utilize only a 10 mole percent excess of urea.

The products obtained by this process are well known and are finding increasing commercial importance as coatings for metallic materials and as intermediates in the production of monomers employed in the plastic field. Particular interest has developed in the use of lead cyanate in water base paints and primers since it appears that it is an excellent corrosive inhibiting pigment for use therein. Such systems offer advantages in that they present less fire hazards in fumes, as well as possible quality and cost improvements. Furthermore, lead cyanate can be reduced to form the corresponding cyanide and may also be employed as a chemical intermediate for the preparation of other useful chemicals such as the urethanes, other metal cyanates and the like.

I have described what I believe to be the best embodiments of my invention. However, I do not wish to be confined within those embodiments in the enumerated examples which are only illustrative of my invention but what I desire to cover by Letters Patent as set forth in the appended claims.

I claim:

1. A process for the manufacture of lead cyanate comprising effecting reaction between lead oxide and urea at essentially atmospheric pressure and at a temperature within the range of from about 135 to 145° C. sufficient to cause the evolution of ammonia and the formation of lead cyanate.

2. The process of claim 1 further characterized in that the mole ratio of urea to lead oxide is within the range of from about 2.5:1 to about 2:1.

3. A process for the manufacture of lead cyanate comprising heating at essentially atmospheric pressure a pulverulent mixture of a lead oxide and urea, both initially having an average particle size of less than about 2 mm. to a temperature within the range of from about 135 to 145° C. sufficient to cause the evolution of ammonia and the formation of lead cyanate.

4. The process of claim 3 wherein the temperature is approximately 140° C.

5. The process of claim 4 further characterized in that said reaction is conducted in the presence of an inert medium.

6. The process of claim 5 further characterized in that the mole ratio of urea to lead oxide is within the range of from about 2.5:1 to about 2:1.

7. The process of claim 6 further characterized in that said heat is applied for a time between about 5 to 20 minutes.

8. The process of claim 7 further characterized in that said reactants form a reactant bed not exceeding about 2 inches in thickness.

References Cited in the file of this patent

UNITED STATES PATENTS

| | | |
|---|---|---|
| 1,915,425 | Kloepfer | June 27, 1933 |
| 2,729,541 | De Pree et al. | Jan. 3, 1956 |
| 2,801,154 | De Pree et al. | July 30, 1957 |